US009588991B2

(12) United States Patent
Cevahir et al.

(10) Patent No.: US 9,588,991 B2
(45) Date of Patent: Mar. 7, 2017

(54) IMAGE SEARCH DEVICE, IMAGE SEARCH METHOD, PROGRAM, AND COMPUTER-READABLE STORAGE MEDIUM

(75) Inventors: Ali Cevahir, Tokyo (JP); Junji Torii, Chiba (JP)

(73) Assignee: RAKUTEN, INC., Tokyo (JP)

( * ) Notice: Subject to any disclaimer, the term of this patent is extended or adjusted under 35 U.S.C. 154(b) by 44 days.

(21) Appl. No.: 14/344,913

(22) PCT Filed: Nov. 25, 2011

(86) PCT No.: PCT/JP2011/077149
§ 371 (c)(1),
(2), (4) Date: Mar. 14, 2014

(87) PCT Pub. No.: WO2013/038574
PCT Pub. Date: Mar. 21, 2013

(65) Prior Publication Data
US 2015/0052139 A1 Feb. 19, 2015

(30) Foreign Application Priority Data
Sep. 16, 2011 (JP) .................. 2011-202713

(51) Int. Cl.
*G06F 17/30* (2006.01)
*G06T 1/20* (2006.01)
(Continued)

(52) U.S. Cl.
CPC .. *G06F 17/30271* (2013.01); *G06F 17/30247* (2013.01); *G06F 17/30256* (2013.01);
(Continued)

(58) Field of Classification Search
CPC ......... G06F 17/30271; G06F 17/30601; G06F 17/30713; G06F 17/30247; G06F 17/30598;
(Continued)

(56) References Cited

U.S. PATENT DOCUMENTS 4,344,134 A * 8/1982 Barnes ........................... 712/16
4,742,552 A * 5/1988 Andrews ....................... 382/303
(Continued)

FOREIGN PATENT DOCUMENTS

EP 1089198 A2 4/2001
EP 2138957 A2 12/2009
(Continued)

OTHER PUBLICATIONS

"Accelerating Image Retrieval Using Factorial Correspondence Analysis on GPU," by Pham et al. In: Computer Analysis of Images and Patterns (2009). Available at: SpringerLink.*
(Continued)

*Primary Examiner* — Christyann Pulliam
*Assistant Examiner* — Dustin Eyers
(74) *Attorney, Agent, or Firm* — Hubbs, Enatsky, Inoue PLLC

(57) ABSTRACT

An image search device includes a common memory and a plurality of parallel processors for executing a same instruction. The image search device transfers, from storage, a plurality of representative feature vectors, which respectively represent a plurality of clusters including a plurality of image feature vectors, stores, in the common memory, one or more query feature vectors extracted from an image serving as a query, calculates a distance between the plurality of transferred representative feature vectors and the query feature vector using the plurality of parallel processors, and selects one or more of a plurality of images based
(Continued)

on a distance between the plurality of image feature vectors, which belong to the cluster selected by the calculated distance, and the query feature vector.

20 Claims, 11 Drawing Sheets

(51) Int. Cl.
    *G06K 9/62*         (2006.01)
    *G06K 9/00*         (2006.01)

(52) U.S. Cl.
    CPC .. *G06F 17/30445* (2013.01); *G06F 17/30598* (2013.01); *G06F 17/30601* (2013.01); *G06K 9/6263* (2013.01); *G06K 9/6271* (2013.01); *G06T 1/20* (2013.01); *G06K 9/00979* (2013.01)

(58) Field of Classification Search
    CPC ........ G06F 17/30256; G06F 17/30445; G06K 9/6263; G06K 9/6271; G06T 1/20
    See application file for complete search history.

(56) References Cited

U.S. PATENT DOCUMENTS

| | | | |
|---|---|---|---|
| 4,985,827 A * | 1/1991 | Hamanaka et al. | 712/6 |
| 5,253,308 A * | 10/1993 | Johnson | 382/304 |
| 6,134,541 A | 10/2000 | Castelli et al. | |
| 6,285,995 B1 * | 9/2001 | Abdel-Mottaleb et al. | 707/737 |
| 6,728,752 B1 * | 4/2004 | Chen et al. | 709/203 |
| 8,429,173 B1 * | 4/2013 | Rosenberg et al. | 707/748 |
| 8,515,193 B1 * | 8/2013 | Han | H04N 19/30 382/238 |
| 2004/0088521 A1 * | 5/2004 | Barlow et al. | 712/7 |
| 2005/0125369 A1 | 6/2005 | Buck et al. | |
| 2007/0211064 A1 | 9/2007 | Buck et al. | |
| 2007/0244925 A1 * | 10/2007 | Albouze | 707/104.1 |
| 2009/0097756 A1 | 4/2009 | Kato | |
| 2010/0318515 A1 * | 12/2010 | Ramanathan et al. | 707/723 |
| 2011/0158558 A1 | 6/2011 | Zhao et al. | |
| 2012/0143856 A1 | 6/2012 | Klinkigt et al. | |
| 2013/0121535 A1 | 5/2013 | Matsukawa | |
| 2015/0016729 A1 * | 1/2015 | Cevahir | G06F 17/30247 382/195 |
| 2015/0066957 A1 * | 3/2015 | Cevahir | G06F 17/30277 707/749 |
| 2016/0085811 A1 * | 3/2016 | Deolalikar | G06F 17/30598 707/738 |

FOREIGN PATENT DOCUMENTS

| | | |
|---|---|---|
| JP | 06-274548 A | 9/1994 |
| JP | 2001-160070 A | 6/2001 |
| JP | 2005-182785 A | 7/2005 |
| JP | 2005-234994 A | 9/2005 |
| JP | 2006-031567 A | 2/2006 |
| JP | 2006-338313 A | 12/2006 |
| JP | 2008-021044 A | 1/2008 |
| JP | 2009-093563 A | 4/2009 |
| JP | 2010-250637 A | 11/2010 |
| JP | 2011-103082 A | 5/2011 |
| JP | 2011-107795 A | 6/2011 |
| JP | 2011-113197 A | 6/2011 |
| JP | 2012-033022 A | 2/2012 |
| WO | 2006/033257 A1 | 3/2006 |
| WO | 2009/060722 A1 | 5/2009 |
| WO | 2011/021605 A1 | 2/2011 |

OTHER PUBLICATIONS

"A Parallel Implementation of Content-Based Image Retrieval: Final Project Report," by Fang & Anderson. In: U. Cincinnati, Dept. Comp. Sci. (2008). Available at: http://cs.uc.edu/~fangcg/course/CS668%20Final%20Project%20Report.pdf.*

"Content-based image retrieval," by Wikipedia (Aug. 2, 2011 Revision). Available at: http://en.wikipedia.org/w/index.php?title=Content-based_image_retrieval&oldid=442654277.*

"Type Conversion," by Wikipedia (Sep. 5, 2011 revision). Available at: http://en.wikipedia.org/w/index.php?title=Type_conversion&oldid=448573374.*

Fundamentals of Computers & Programming in C, by Dixit, J.B. 2005 Laxmi Pub. Lt.*

"Distance and Correlation," by Borgatti, Steve. (Wayback machine to Mar. 20, 2011). Available at: http://web.archive.org/web/20110320041117/http://www.analytictech.com/mb876/handouts/distance_and_correlation.htm Original URL: http://www.analytictech.com/mb876/handouts/distance_and_correlation.htm.*

Empowering Visual Categorization with the GPU, by Sande et al. In: IEEE Trans. on Multimedia, vol. 13, No. 1, Feb. 2011. Available at: IEEE.*

Evaluation of Similarity Measurement for Image Retrieval, by Zhang & Lu. In: IEEE. Int'l Conf. Neural Networks & Signal Processing (2003). Available at: IEEE.*

Cache Memory: Replacement Policy, by Wang, Ruye (2005). Available at: http://fourier.eng.hmc.edu/e85_old/lectures/memory/node5.html.*

Partial Translation of the Office Action for a related Japanese Patent Application No. 2012-078343 dated on Feb. 4, 2014.

International Search Report for PCT/JP2011/077149 dated Jan. 17, 2012.

International Search Report for a related application PCT/JP2013/059546 dated Apr. 23, 2013.

International Search Report for a related application PCT/JP2013/059551 dated Apr. 23, 2013.

English Translation of Written Opinion of the International Searching Authority for PCT/JP2011/077149 accompanied with PCT/IB/373 and PCT/IB/338 dated Mar. 27, 2014, acting as concise explanation of previously submitted reference(s).

Eitz M et al: "An evaluation of descriptors for large-scale image retrieval from sketched feature lines", Computer and Graphics, Elsevier, GB, vol. 34, No. 5, Oct. 1, 2010, pp. 482-498.

Peter L. Stanchev et al: "Selection of MPEG-7 Image Features for Improving Image Similarity Search on Specific Data Sets" Aug. 17, 2004 (Aug. 17, 2004), XP55269991, Michigan, USA Retrieved from the Internet: URL: https://paws.kettering.edu/~pstanche/haw04.pdf Cited in the Office Action of Jun. 3, 2016 for corresponding EP application No. 13768360.3.

Fukunaga K et al:"A Branch and Bound Algorithm for Computing k-Nearest Neighbors", IEEE Transactions on Computers, IEEE Service Center, Los Alamitos, CA, US, vol. C-24, No. 7, Jul. 1, 1975 (Jul. 1, 1975), pp. 750-753, XP011382658, ISSN: 0018-9340, DOI: 10.1109/T-C.1975.224297 Cited in the Office Action of Jun. 16, 2016 for corresponding EP application No. 11872292.5.

"NVIDIA CUDA Compute Unified Device Architecture, programming guide",, Nov. 29, 2007(Nov. 29, 2007), pp. I-XIII, 1, XP008139068, Retrieved from the Internet: URL:http://developer.download.nvidia.com/compute/cuda/1_1/NVIDIA_CUDA_Programming_Guide_1.1.pdf [retrieved on Nov. 29, 2007].

David B. Kirk et al: "Programming Massively Parallel Processors—A Hands-on Approach", Dec. 31, 2010 (Dec. 31, 2010), pp. 1-279, XP055073181, Retrieved from the Internet: URL:http://www.elsevier.com/books/programming-massively-parallel-processors/kirk/978-0-12-381472-2 [retrieved on Jul. 26, 2013].

* cited by examiner

| IMAGE | NUMBER OF TIMES SEARCHED |
|---|---|
|  | 41 |
|  | 23 |
|  | 18 |
|  | 16 |

IMAGE SEARCH DEVICE, IMAGE SEARCH METHOD, PROGRAM, AND COMPUTER-READABLE STORAGE MEDIUM

CROSS REFERENCE TO RELATED APPLICATIONS

This application is a National Stage of International Application No. PCT/JP2011/077149 filed Nov. 25, 2011, claiming priority based on Japanese Patent Application No. 2011-202713 filed on Sep. 16, 2011. The contents of each of the above documents are incorporated herein by reference in their entirety.

TECHNICAL FIELD

The present invention relates to an image search device, an image search method, a program, and a computer-readable storage medium.

BACKGROUND ART

Advances in network technology have resulted in an enormous number of image files to be managed. There has been available an image search method for searching an image similar to an image serving as a query from the enormous number of images. For selecting an image from the enormous number of images with speed, a search method called BoF (Bag of Features) approach is under development. This approach is based on a document search method called BoW (Bag of Words) model. By BoF approach, feature vectors extracted from a search target image are respectively associated with Visual Words, which correspond to words in the BoW model, and the similar image is searched by using appearance frequency of the Visual Words.

Patent Literature 1 discloses converting image feature amount vectors extracted from an image serving as a query into a smaller number of vectors by using a clustering method, and searching images using the converted vectors as queries.

CITATION LIST

Patent Literature

Patent Literature 1: JP2011-107795A

SUMMARY OF INVENTION

Technical Problem

Image data has a large amount of data compared to character data, and thus processing amount for searching images needs to be reduced in order to perform searching images at a similar speed as searching characters by using a usual CPU. As such, there has been a difficulty in obtaining enough search accuracy because, for example, Visual Words have to be used for generating a search index even though Visual Words are not able to properly indicate features of the image data.

In view of the above, it is conceivable to use hardware having, for example, a so-called GPU (Graphic Processing Unit) that is computationally more powerful than a CPU. The GPU includes processors and a common memory. The processors respectively acquire data efficiently from the common memory, and perform arithmetic processing by executing a common program. If hardware such as a GPU could perform arithmetic processing with fast speed, fast search is available while maintaining search accuracy.

However, the above mentioned BoF approach is optimized for a CPU, and heavily uses a linked list data structure and branch instructions because a sparse matrix is used. Such structure and instructions have low compatibility with an architecture of the GPU having the above mentioned features, and thus there has been a problem that the GPU is not fully utilized when used as is.

One or more embodiments of the present invention have been conceived in view of the above, and an object thereof is to accelerate image search processing with use of hardware, such as a GPU, having high ability of executing a large amount of the same types of processing.

Solution to Problem

In order to solve the above described problems, an image search device according to the present invention includes a common memory and a plurality of parallel processors for executing a same instruction, reading data stored in the common memory in bulk, and processing the data. The image search device further includes representative vector transfer means for transferring a plurality of representative feature vectors from storage means to the common memory, the storage means storing a plurality of image feature vectors that are respectively extracted from a plurality of search target images and respectively belong to a plurality of clusters, and the plurality of representative feature vectors each of which represents one of the plurality of clusters, query feature vector obtaining means for obtaining and storing, in the common memory, one or more query feature vectors that are extracted from an image serving as a query, first distance calculating means for calculating a distance between at least a part of the transferred plurality of representative feature vectors and the query feature vector using the plurality of parallel processors, second distance calculating means for calculating a distance between the plurality of image feature vectors, which belong to the cluster selected based on a calculation result of the first distance calculating means, and the query feature vector, and selecting means for selecting at least one of the plurality of images based on a calculation result of the second distance calculating means.

A program according to the present invention causes a computer, which includes a common memory and a plurality of parallel processors for executing a same instruction, reading data stored in the common memory in bulk and processing the data, to function as representative vector transfer means for transferring a plurality of representative feature vectors from storage means to the common memory, the storage mean storing a plurality of image feature vectors that are respectively extracted from a plurality of search target images and respectively belong to a plurality of clusters, and the plurality of representative feature vectors each of which represents one of the plurality of clusters, query setting means for setting, in the common memory, one or more query feature vectors that are extracted from an image serving as a query, first distance calculating means for calculating a distance between at least a part of the transferred plurality of representative feature vectors and the query feature vector using the plurality of parallel processors, second distance calculating means for calculating a distance between the plurality of image feature vectors that belong to the cluster selected based on a calculation result of the first distance calculating means and the query feature vector, and selecting means for selecting at least one of the plurality of images based on a calculation result of the second distance calculating means.

An image search method according to the present invention causes a computer, which includes a common memory and a plurality of parallel processors for executing a same instruction and reading data stored in the common memory in bulk and processing the data, to search an image, and includes a representative vector transfer step of transferring a plurality of representative feature vectors from storage means to the common memory, the storage mean storing a plurality of image feature vectors that are respectively extracted from a plurality of search target images and respectively belong to a plurality of clusters, and the plurality of representative feature vectors each of which represents one of the plurality of clusters, a query setting step of setting, in the common memory, one or more query feature vectors extracted from an image serving as a query, a first distance calculating step of calculating a distance between at least a part of the transferred plurality of representative feature vectors and the query feature vector using the plurality of parallel processors, a second distance calculating step of calculating a distance between the plurality of image feature vectors that belong to the cluster selected based on a calculation result of the first distance calculating step and the query feature vector, and a selecting step of selecting at least one of the plurality of images based on a calculation result of the second distance calculating step.

A computer-readable storage medium according to the present invention stores a program for causing a computer, which includes a common memory and a plurality of parallel processors for executing a same instruction, reading data stored in the common memory in bulk and processing the data, to function as representative vector transfer means for transferring a plurality of representative feature vectors from storage means to the common memory, the storage mean storing a plurality of image feature vectors that are respectively extracted from a plurality of search target images and respectively belong to a plurality of clusters, and the plurality of representative feature vectors each of which represents one of the plurality of clusters, query setting means for setting, in the common memory, one or more query feature vectors extracted from an image serving as a query, first distance calculating means for calculating a distance between at least a part of the transferred plurality of representative feature vectors and the query feature vector using the plurality of parallel processors; second distance calculating means for calculating a distance between the plurality of image feature vectors that belong to the cluster selected based on a calculation result of the first distance calculating means and the query feature vector, and selecting means for selecting at least one of the plurality of images based on a calculation result of the second distance calculating means.

According to the present invention, faster image search process can be achieved with use of hardware, such as a GPU, capable of performing a large amount of the same type of processing. By using the representative vector, the number of feature vectors to be targets of distance calculation can be reduced and the distance calculation will occupy large portions of the process, and such process has high compatibility with hardware capable of performing a large amount of the same type of processing, such as a GPU.

In an embodiment of the present invention, the image search device may further include image feature vector transfer means for transferring the image feature vector, which belongs to the cluster selected based on the calculation result of the first distance calculating means, from the storage means to the common memory, and the second distance calculating means may calculate a distance between the transferred image feature vector and the query feature vector using the plurality of parallel processors.

In an embodiment of the present invention, a data amount of the plurality of representative feature vectors may be less than a size of the common memory.

In an embodiment of the present invention, a data amount of the plurality of image feature vectors that belongs to one of the plurality of clusters may be less than the size of the common memory, and a data amount of the plurality of image feature vectors that belongs to the plurality of clusters may be more than the size of the common memory.

In an embodiment of the present invention, a data amount of the plurality of image feature vectors that belongs to one of the plurality of clusters and the plurality of representative vectors may be less than the size of the common memory, and the image feature vector transfer means may replace the plurality of image feature vectors that belong to the selected cluster with other image feature vectors stored in the common memory.

In an embodiment of the present invention, the image search device may further includes image feature vector additional extracting means for extracting a plurality of image feature vectors from an image to be added as a search target, and image feature vector adding means for adding the plurality of image feature vectors that are extracted by the image feature vector additional extracting means to one of the image feature clusters.

DESCRIPTION OF EMBODIMENTS

Figure 1:
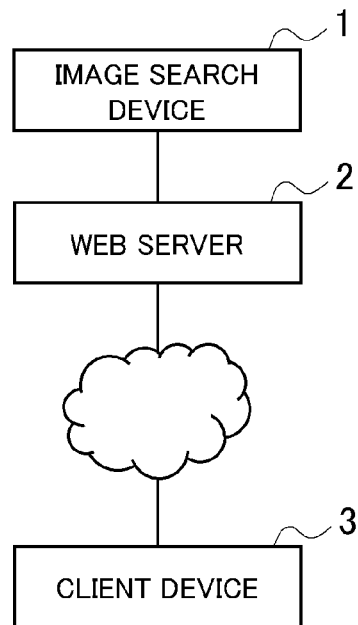
FIG. 1 A diagram illustrating an example of a configuration of an image search system according to an embodiment of the present invention.

In the following, an embodiment of the present invention will be described in detail with reference to the accompanying drawings. Elements having the same function will be designated with the same reference numerals, and their overlapping explanation will be omitted.

FIG. 1 illustrates an example of an image search system according to an embodiment of the present invention. The image search system includes an image search device 1, a web server 2, and a client device 3. The web server 2 is, for example, sever hardware operated by a web server program, and the client device 3 is, for example, a personal computer or a smartphone operated by a program of a web browser. A summary of the operation of the image search system for performing an image search is as follows. The web server 2 obtains an image serving as a query to be used for image search (hereinafter referred to as "query image") from the client device 3 through the network such as the Internet, and inputs the query image to the image search device 1. Subsequently, the image search device 1 searches for one or more images similar to the input image, and outputs the images to the web server 2. The web server 2 outputs data that enables the client device 3 to display the image searched by the image search device 1.

Figure 2:
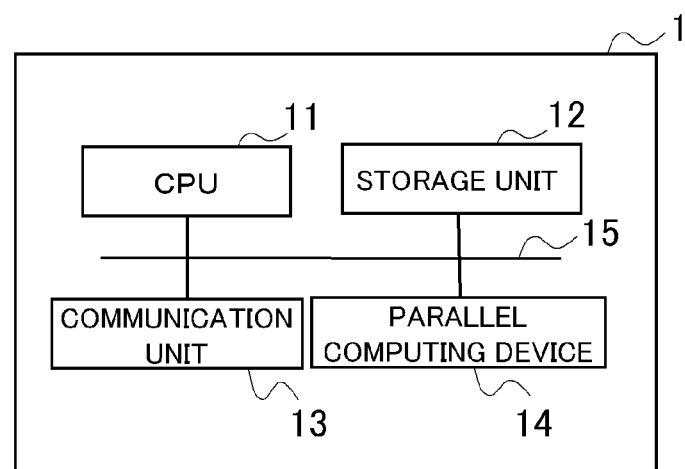
FIG. 2 A diagram illustrating an example of a configuration of an image search device according to an embodiment of the present invention.

FIG. 2 illustrates an example of the structure of the image search device 1 according to the embodiment of the present invention. The image search device 1 includes a CPU 11, a storage unit 12, a communication unit 13, a parallel computing device 14, and a bus 15.

The CPU 11 operates according to a program stored in the storage unit 12. The CPU 11 controls the communication unit 13 and the parallel computing device 14. The program may be provided through the network such as the Internet, or provided by being stored in a computer-readable information storage medium such as a DVD-ROM or a USB memory.

The storage unit 12 includes, for example, a memory device such as a RAM or a ROM and a hard disk drive. The storage unit 12 stores the program. The storage unit 12 also stores information or computational result input from each unit.

The communication unit 13 is configured with, for example, communication means using a network card so as to communicate with other devices, such as the web server 2. The communication unit 13 inputs information received from other devices into the CPU 11 or the storage unit 12 based on the control of the CPU 11, and sends the information to other devices.

The bus 15 is configured to send or receive data with the CPU 11, the storage unit 12, the communication unit 13, and the parallel computing device 14. For example, the CPU 11 or the storage unit 12 is connected to the parallel computing device 14 through an expansion bus in the bus 15.

Figure 3:
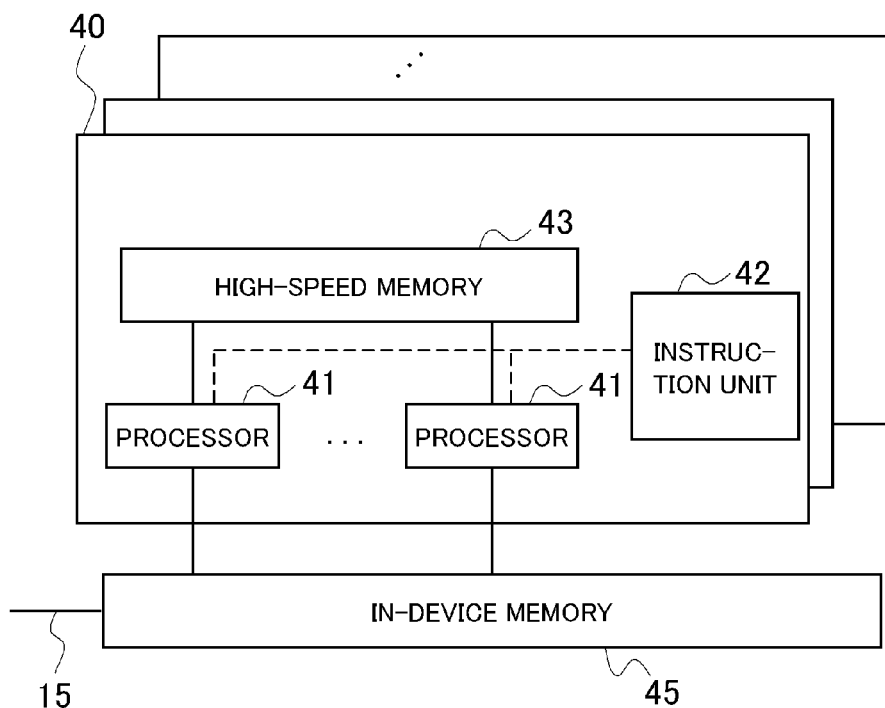
FIG. 3 A diagram illustrating an example of a configuration of a parallel computing device.

The parallel computing device 14 is hardware good at performing a large amount of the same type of the computation by parallel computation. The parallel computing device 14 is, for example, a GPU. FIG. 3 illustrates an example of a configuration of the parallel computing device 14. The parallel computing device 14 includes parallel execution units 40 and an in-device memory 45. Each parallel execution unit 40 includes plural processors 41, an instruction unit 42, and a high-speed memory 43.

Each processor 41 performs floating-point computation and reading or writing data with the in-device memory 45 and the high-speed memory 43. The instruction unit 42 causes the processors 41, which are included in the parallel execution unit 40 including the instruction unit 42, to perform processing based on a program stored in the in-device memory 45 etc. The processors 41 included in one of the parallel execution units 40 process the same instruction according to an instruction from the instruction unit 42 included in such parallel execution unit 40. In this way, a plurality of processors 41 can be controlled by one instruction unit 42, thereby suppressing an increase in circuit size of the instruction unit 42. As such, it is possible to increase the number of the processors 41 included in the parallel computing device 14 compared to a case of the CPU 11.

The in-device memory 45 is composed of a DRAM that is capable of higher speed access than a RAM used in the storage unit 12. The in-device memory 45 is connected to the CPU 11 and the storage unit 12 through the bus 15. The parallel computing device 14 also includes a circuit for transferring data between the in-device memory 45 and the storage unit 12 via a DMA transfer. The high-speed memory 43 is composed of, for example, a SRAM that is capable of higher speed access than the in-device memory 45. There is not so much difference between latency when the processor 41 accesses the high-speed memory 43 and latency when the processor 41 accesses its internal register. Here, each of the in-device memory 45 and the high-speed memory 43 is a common memory accessible from the processors 41.

Figure 4:
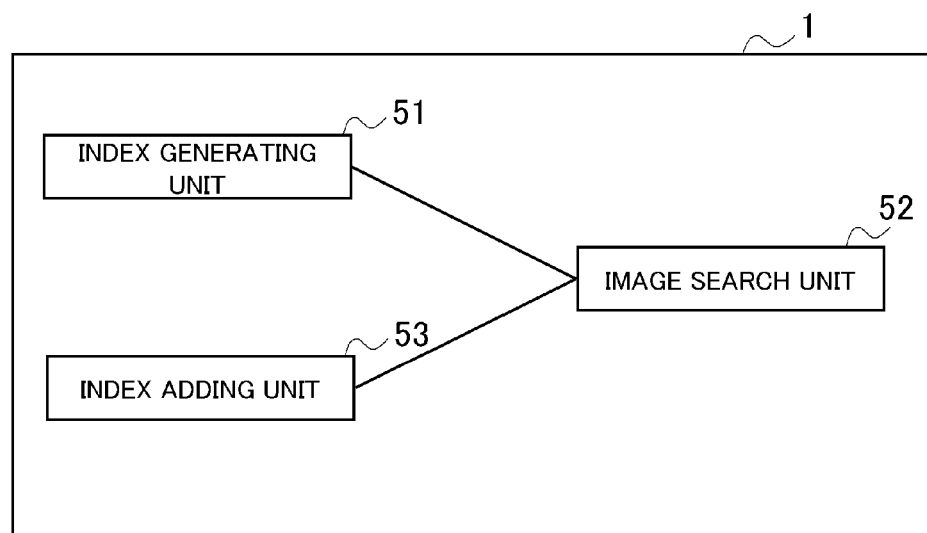
FIG. 4 A functional block diagram illustrating functions of the image search device according to an embodiment of the present invention.

FIG. 4 is a functional block diagram showing functions of the image search device 1 according to the embodiment of the present invention. The image search device 1 functionally includes an index generating unit 51, an image search unit 52, and an index adding unit 53. These functions are implemented by the CPU 11 executing the program stored in the storage unit 12 and controlling the communication unit 13 and the parallel computing device 14, and by the parallel computing device 14 executing the program for the parallel computing device 14.

The index generating unit 51 generates, from images as search targets, an image feature vector 20 used for the image search and an index allowing an easy selection of the image feature vector 20. The image search unit 52 searches an image similar to the query image with use of the index and the image feature vector 20. The index adding unit 53 generates an image feature vector 20 from an additional image, and changes the index so as to select the additional image.

Figure 5:
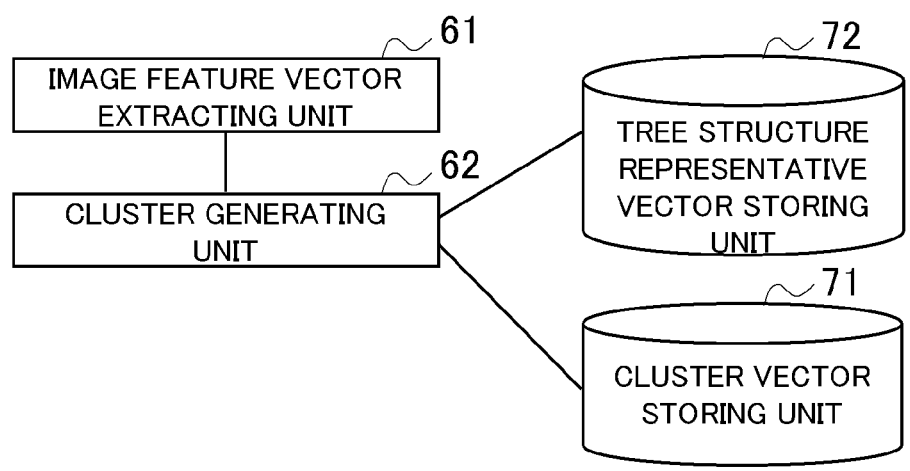
FIG. 5 A functional block diagram illustrating a functional configuration of an index generating unit.

FIG. 5 is functional block diagram showing a functional configuration of the index generating unit 51. The index generating unit 51 functionally includes an image feature vector extracting unit 61 and a cluster generating unit 62. The cluster generating unit 62 generates a tree structure of a representative vector, which is an index of a cluster, and stores information on the index into the tree structure representative vector storing unit 72. The cluster vector storing unit 71 stores information on the image feature vector 20 belonging to the cluster represented by the representative vector, which is a leaf of the tree structure. In particular, the cluster vector storing unit 71 and the tree structure representative vector storing unit 72 are composed of the storage unit 12.

The image feature vector extracting unit 61 is implemented mainly by the CPU 11 and the storage unit 12. The image feature vector extracting unit 61 extracts image feature vectors 20 from search target images stored in the storage unit 12. In particular, the image feature vector extracting unit 61 extracts one or more image feature vectors 20 from each of the images, and stores the extracted image feature vectors 20 in the storage unit 12 in association with the image from which the image feature vectors 20 are extracted.

Figure 6:
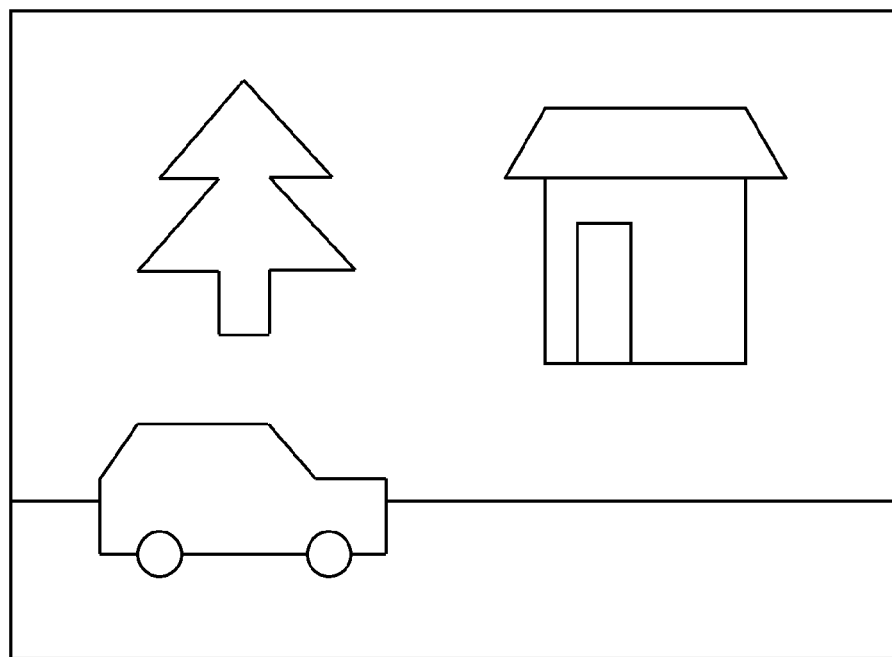
FIG. 6 A diagram illustrating an example of an image as search target.
Figure 7:
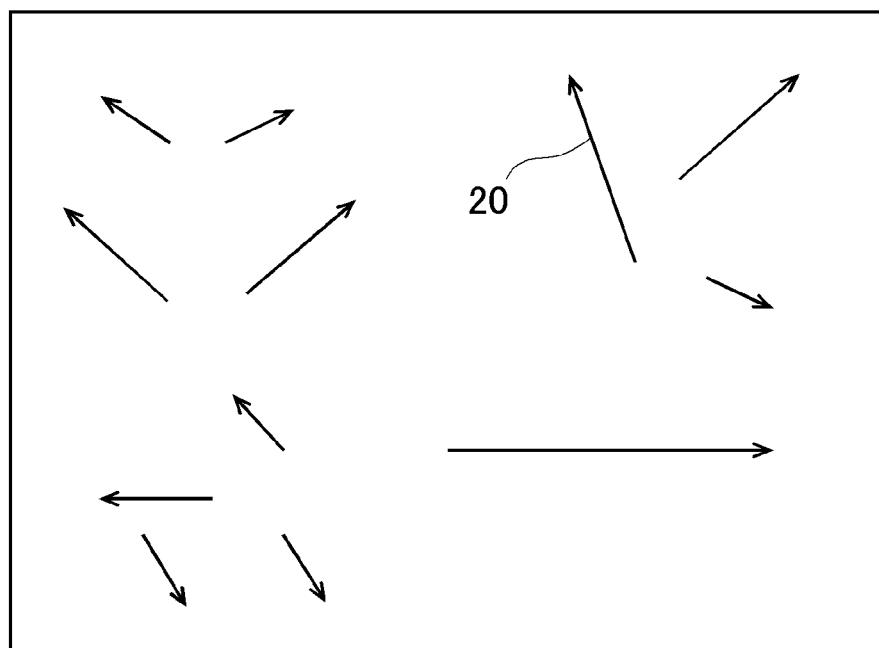
FIG. 7 A diagram illustrating a concept of image feature vectors extracted from an image.

FIG. 6 illustrates an example of images as search targets. FIG. 7 illustrates a concept of image feature vectors 20 extracted from an image. Each of the image feature vectors 20 extracted from the image is a local characteristic amount, which shows local features in the image. Each of the image feature vectors 20 is a vector having, for example, 128 elements (dimensions). The well-known methods, such as SIFT (Scale-Invariant Feature transform) and SURF (Speeded Up Robust Features), may be used in order to extract the image feature vectors 20. The number of elements which each image feature vector 20 has may be changed in accordance with a method for extracting from an image. Further, the number of image feature vectors 20 extracted from an image may be a predetermined number (e.g., 300). The number of image feature vectors 20 extracted from a simple image may be less than the predetermined number.

The cluster generating unit 62 is implemented mainly by the CPU 11 and the storage unit 12. The cluster generating unit 62 groups the image feature vectors 20 extracted by the image feature vector extracting unit 61 into clusters by clustering. The clustering of image feature vectors 20 may include not only a single stage, but also multiple stages. In addition, the multiple stages may be performed by recursively calling processed mentioned below. In the following, a case will be explained where two-stage clustering processes are performed. In the first stage, image feature vectors 20 extracted by the image feature vector extracting unit 61 are grouped into 1,024 clusters, and in the second stage, each of the 1024 clusters are divided into 512 clusters.

The following two processes are performed in respective stages in the cluster generating unit 62. The first process is grouping obtained image feature vectors 20 into a predetermined number of clusters by clustering so as to generate plural clusters. The second process is generating representative vectors of the generated clusters, and storing the generated representative vectors in the tree structure representative vector storing unit 72 as the representative vectors in the stage. When the stage in progress is not the last stage, the cluster generating unit 62 recursively calls the process in the next stage using image feature vectors 20 belonging to respective clusters generated in the stage in progress as input information. The representative vector is, for example, the centroid for the image feature vector 20 belonging to the grouped cluster, and representative of the cluster. The cluster generating unit 62 stores, for each cluster generated in the last stage, the image feature vectors 20 belonging to the cluster into the cluster vector storing unit 71.

In the above example, in the first stage, the cluster generating unit 62 groups obtained image feature vectors 20 into 1,024 clusters, then generates respective representative vectors of the grouped clusters in the first stage, and stores the generated representative vectors in the first stage into the tree structure representative vector storing unit 72. In the second stage, the cluster generating unit 62 further groups the respective 1,024 clusters into 512 clusters using the image feature vectors 20 belonging to corresponding one of the 1,024 clusters generated in the first stage as input information, then generates respective representative vectors of the grouped clusters in the second stage, and stores the generated representative vectors in the lower stage into the tree structure representative vector storing unit 72. If all clusters are generated in the second stage, the total number of the clusters equals to (1024×512). The cluster generating unit 62 also stores, for each cluster generated in the second stage, the image feature vectors 20 belonging to the cluster into the cluster vector storing unit 71. In the following, for simplicity, the representative vector that is representative of the cluster in the first stage is referred to as an upper representative vector, and the representative vector that is representative of the cluster in the last stage (second stage in the above) is referred to as a representative feature vector. The finally generated cluster (cluster in the second stage in the above) is referred to as an image feature cluster.

When grouping the image feature vectors 20 into clusters, a known clustering method, such as k-means, may be employed. The number of the clusters may be a power of 2 in a preferred embodiment considering the processes performed in the image search unit 52 described later, but may not necessarily be a power of 2. When the image feature vectors 20 included in all images are grouped, plural image feature vectors 20 belong to each image feature cluster. The cluster generating unit 62 performs two-stage recursive processing, thereby storing information of two tiers into the tree structure representative vector storing unit 72. The cluster generating unit 62 may perform computing using the parallel computing device 14.

Figure 8:
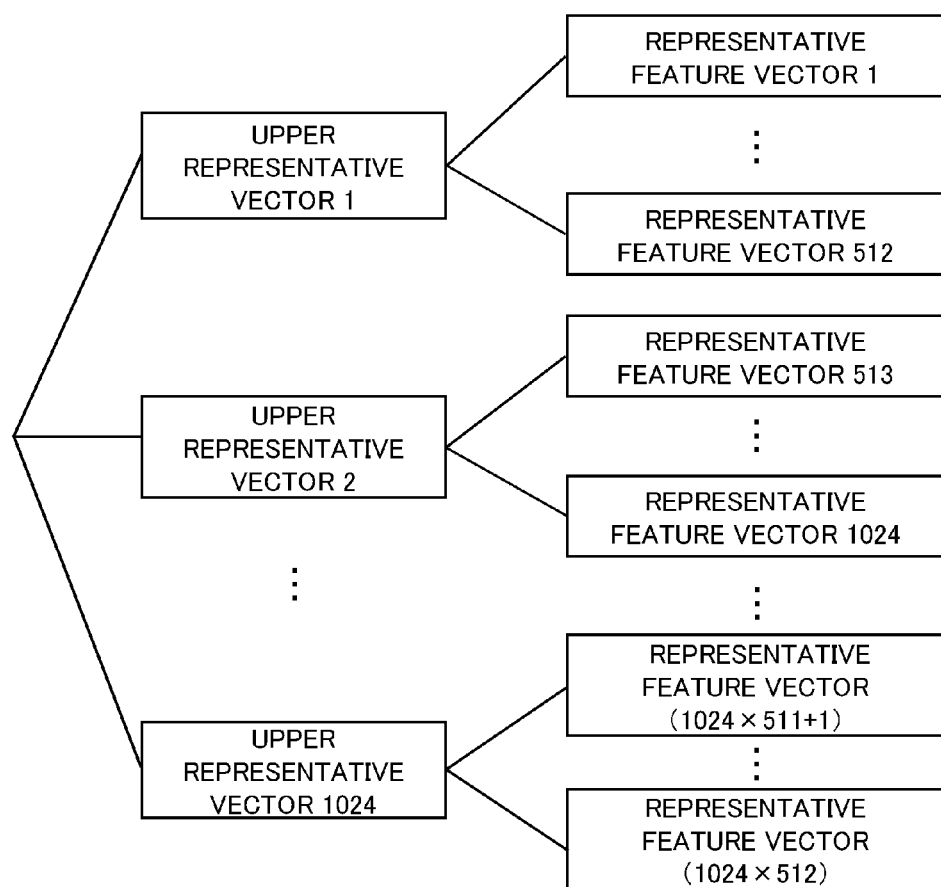
FIG. 8 A diagram illustrating an example of a tree structure of representative vectors.

FIG. 8 illustrates an example of a tree structure of representative vectors. In a case where the cluster generating unit 62 performs two-stage processes as mentioned above, two-stage representative vectors corresponding to two-stage clusters construct a tree structure. The number of the upper representative vectors is 1,024, and each of the upper representative vectors is a parent of 512 representative feature vectors. The image search unit 52 performs searching with use of parent-child relationship in which the representative vectors construct the tree structure.

Figure 9:
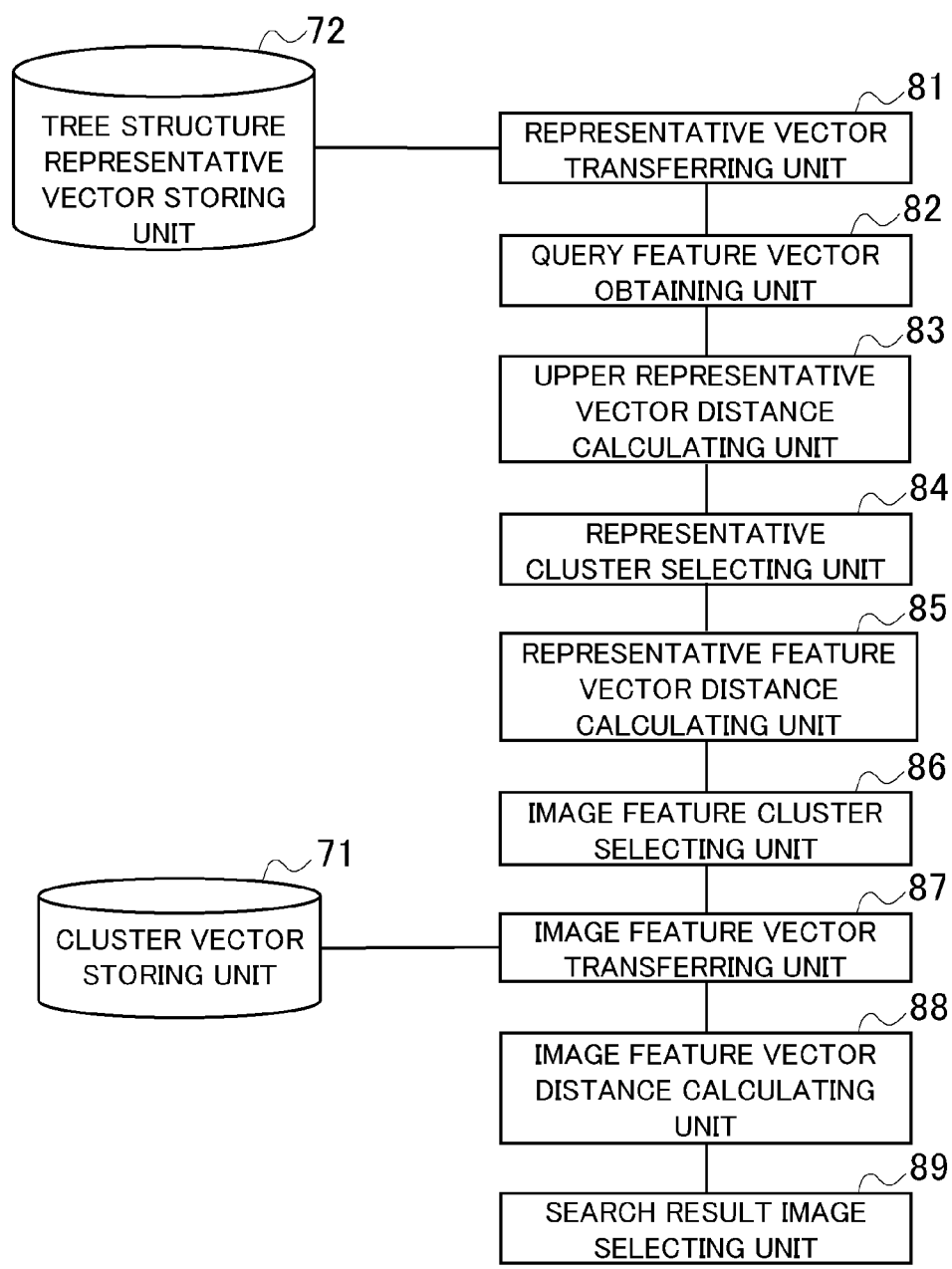
FIG. 9 A functional block diagram illustrating a functional configuration of the image search unit.

FIG. 9 is a functional block diagram showing the functional configuration of the image search unit 52. The image search unit 52 functionally includes a representative vector transferring unit 81, a query feature vector obtaining unit 82, an upper representative vector distance calculating unit 83, a representative cluster selecting unit 84, a representative feature vector distance calculating unit 85, an image feature cluster selecting unit 86, an image feature vector transferring unit 87, an image feature vector distance calculating unit 88, and a search result image selecting unit 89.

The representative vector transferring unit 81 is implemented mainly by the parallel computing device 14 and the storage unit 12. The representative vector transferring unit 81 transfers the upper representative vector and the representative feature vectors stored in the tree structure representative vector storing unit 72 to the in-device memory 45, which is commonly accessible from the processors 41. Each of the representative feature vectors represents an image feature cluster. In particular, the representative vector transferring unit 81 uses DMA (Direct Memory Access) functions of the parallel computing device 14 or the bus 15 to transfer the data from the storage unit 12 to the in-device memory 45.

Figure 10:
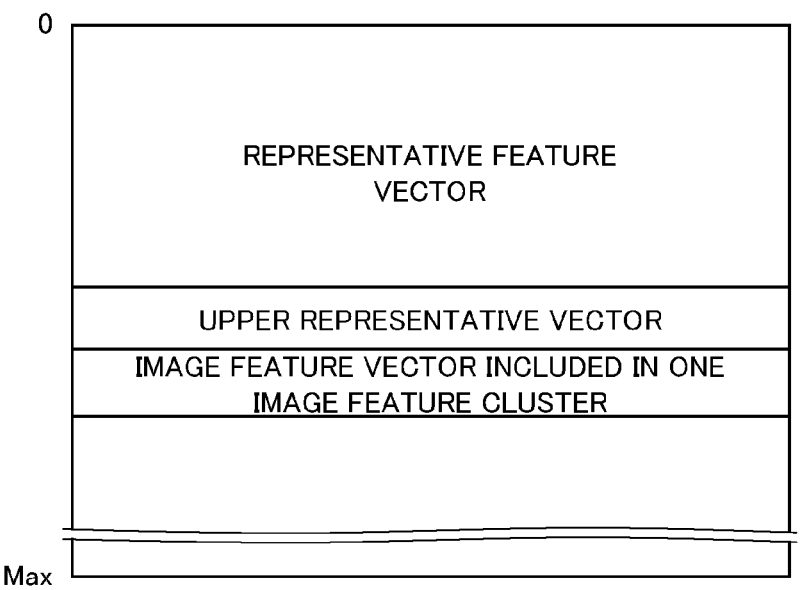
FIG. 10 A diagram illustrating an example of a data arrangement in an in-device memory.

FIG. 10 illustrates an example of data arrangement in the in-device memory 45. The in-device memory 45 includes a region for storing the representative feature vector, a region for storing the upper representative vector, and a region for storing one image feature cluster. The representative vector transferring unit 81 stores information on representative vectors stored in the storage unit 12 into the pre-assigned memory region of the in-device memory 45. Storing data into the region for storing the image feature cluster will be described later.

When the elements of the representative feature vector are 128 dimensions, the number of representative feature vectors is the same as the number of the image feature clusters (1024×512), and each element is 1-byte integer, total data amount of the representative feature vectors is (1024×512×128) bytes (B), i.e., 64 MB. In this case, the number of the upper representative vectors is 1,024, and similarly, data amount of the upper representative vectors is (1024×128) bytes, i.e., 128 KB. For example, memory size of the in-device memory 45 installed in the existing GPU is about 1 GB. If the size of the in-device memory 45 is 1 GB, data amount of the representative vectors is less than the size of the in-device memory 45.

On the other hand, when the number of images is 1 million, and the number of image feature vectors 20 that are extracted from an image is 300, data amount of the image feature vectors 20 included in the image feature clusters is (1 million×300×128) bytes, i.e., about 36 GB, and cannot be stored in the in-device memory 45. The average number of the image feature vectors 20 for each image feature cluster is (1 million×300÷(1024×512)), i.e., about 600, and thus the data amount is about 75 KB. Although the number of the image feature vectors 20 included in the image feature cluster is changed in some degree by clustering, the sum of the data amount of the representative feature vectors, the data amount of the upper representative vectors, and the data amount of the image feature vectors 20 included in an image feature cluster is less than the size of the in-device memory 45.

Figure 11:
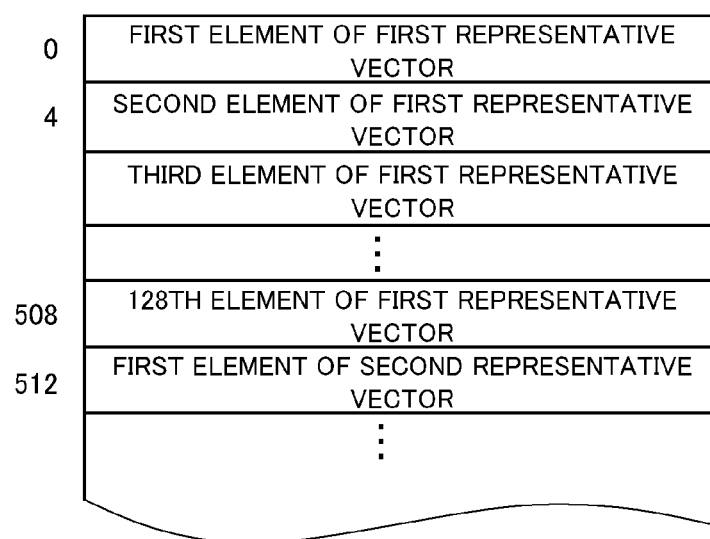
FIG. 11 A diagram illustrating an example of an arrangement of representative vectors in the in-device memory.

FIG. 11 illustrates an example of arrangement of representative vectors in the in-device memory 45. The size of each element of the representative vector stored in the in-device memory 45 is 4 bytes, and elements are lined up in order. The beginning address of data of one of the representative vectors is multiples of number of bytes of data that can be read out from the in-device memory 45 at once (e.g., 32 or 64). This data structure allows the processors 41 to read data stored in the in-device memory 45 in bulk in the process of distance calculation described later. Although the size of each element of the representative vector is 1 byte, the representative vector transferring unit 81 reads data at once, and thus the representative vector transferring unit 81 transfers, to the in-device memory 45, data in which the size of each element is converted into 4 bytes. The upper representative vector and the image feature vectors 20 in an image feature cluster are also stored in the in-device memory 45 by a similar data structure. In the in-device memory 45, the data of the representative feature vectors, the upper representative vectors, and the image feature vectors 20 in an image feature cluster is increased four times in the amount, however the sum of the data amount is still less than the size of the in-device memory 45 in this case. In this embodiment, the number of image feature clusters or representative vectors may be adjusted so that at least the sum of the data amount of the representative feature vectors and the upper representative vectors in the in-device memory 45 is within the size of the in-device memory 45.

The query feature vector obtaining unit 82 is implemented mainly by the CPU 11, the storage unit 12, and the parallel computing device 14. The query feature vector obtaining unit 82 obtains one or more query feature vectors extracted from a query image, and stores the query feature vectors in the in-device memory 45, which is a common memory.

Figure 12:
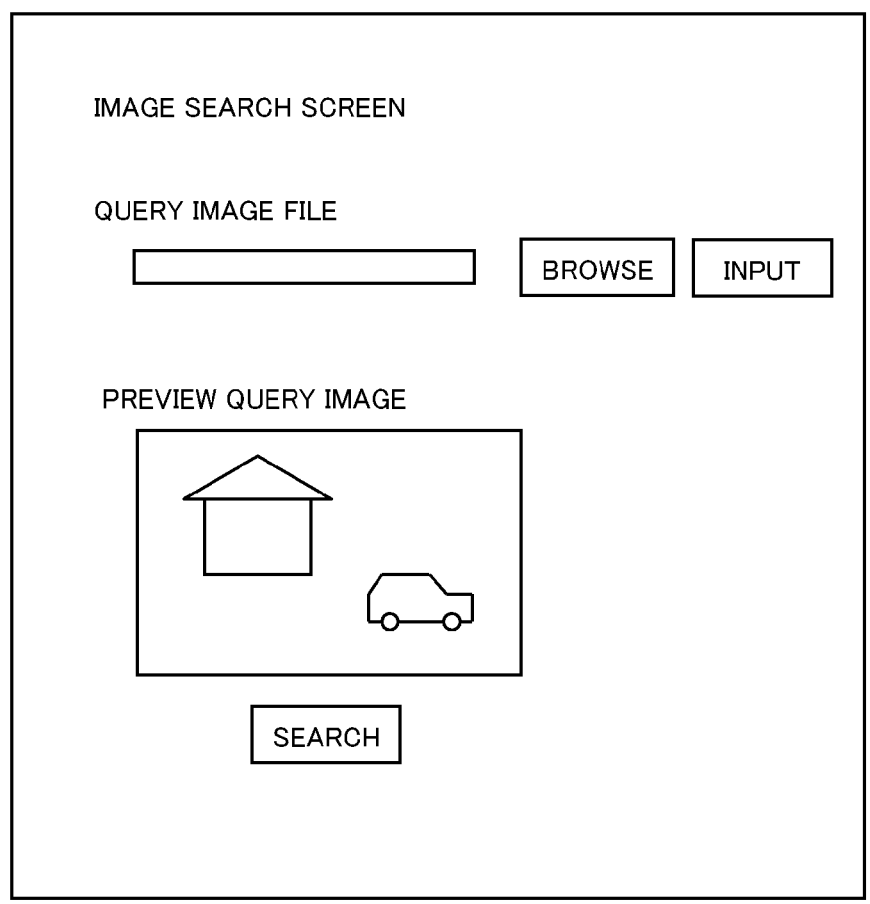
FIG. 12 A diagram illustrating an example of a screen to which an image serving as a query is input.

The query feature vector obtaining unit 82 obtains a query image from the client device 3 through the web server 2. FIG. 12 illustrates an example of a screen to which a query image is input. The client device 3 displays the screen using data generated by the web server 2. The query image may be obtained in a way that a user uploads an image file in the client device 3, or sends an URL of an image displayed on a web page. Alternatively, the query image may be obtained by being selected among from images stored in a photo-sharing service, for example. The query feature vector obtaining unit 82 then obtains the query image through the web server 2, and extracts and obtains one or more query feature vectors from the query image. The query feature vector is generated by the same technique as used by the image feature vector extracting unit 61 to extract the image feature vector 20. Next, the query feature vector obtaining unit 82 stores the query feature vectors in the in-device memory 45. Here, the CPU 11 may extract the query feature vectors, and the parallel computing device 14 may load the query feature vectors into the in-device memory 45. Alternatively, the query image may be loaded into the parallel computing device 14, and the parallel computing device 14 may extract and store the query feature vectors in the in-device memory 45.

The upper representative vector distance calculating unit 83 is implemented mainly by the parallel computing device 14. The upper representative vector distance calculating unit 83 calculates distances between each of the upper representative vectors and the query feature vector using the parallel processors 41. In the following, the details of distance calculation by the upper representative vector distance calculating unit 83 will be explained. The processes in the upper representative vector distance calculating unit 83, the representative cluster selecting unit 84, the representative feature vector distance calculating unit 85, the image feature cluster selecting unit 86, and the image feature vector distance calculating unit 88 are performed for each query feature vector extracted from the query image.

Figure 13:
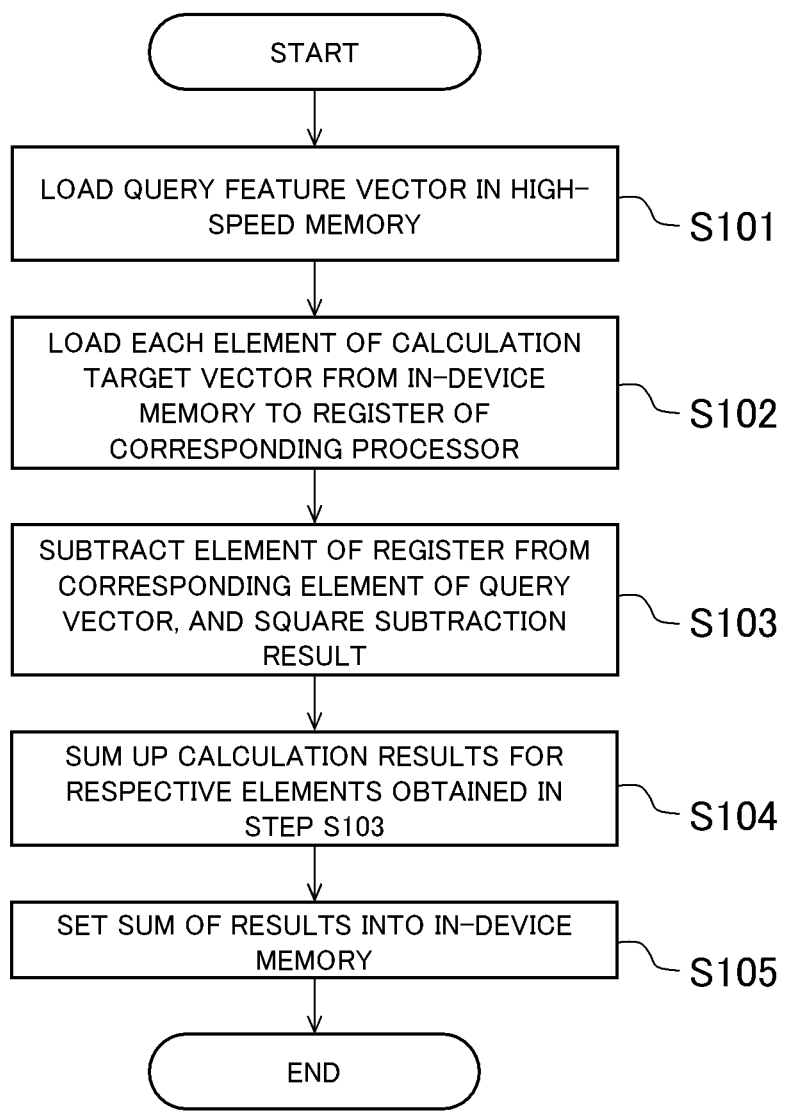
FIG. 13 A diagram illustrating an example of a processing flow chart of distance calculation.

FIG. 13 illustrates an example of a processing flow chart of the distance calculation. The upper representative vector distance calculating unit 83 loads the query feature vectors from the in-device memory 45 into the high-speed memory 43 of the parallel execution unit 40 where the distance calculation is performed (step S101). Subsequently, the upper representative vector distance calculating unit 83 loads each element of a vector as calculation target (here, upper representative vector) from the in-device memory 45 into a register of the processor 41 in which such element is calculated (step S102). At this time, the processors 41 read, in bulk from the in-device memory 45, data of the vector as calculation target. The data of the vector as calculation target is stored in the in-device memory 45 in advance by e.g., the representative vector transferring unit 81 such that the data is read at once, and thus the processors 41 can read the data. The upper representative vector distance calculating unit 83 then subtracts the elements of the vector as calculation target stored in the register from the corresponding elements of the query feature vector, and squares the subtraction result (step S103). The upper representative vector distance calculating unit 83 sums the calculation results obtained in step S103 regarding respective elements of the vector as calculation target (step S104). Subsequently, the upper representative vector distance calculating unit 83 stores the sum of the results into the in-device memory 45 (step S105). When the number of processors 41 that are included in a parallel execution unit 40 and execute the same instruction is less than the number of the elements of the query feature vector or the vector as calculation target, the processes of step S102 through step S104 are divided according to the number of the processors 41, and are executed multiple times. Further, when there are plural parallel execution units 40, the upper representative vector distance calculating unit 83 causes another parallel execution unit 40 to execute processes of step S101 through S105 for another vector as calculation target. Other query feature vectors extracted from the query image may be calculated in parallel. In this manner, the distance calculation of the query feature vectors and other vectors as calculation targets is performed in parallel based on the parallel computing capability of the parallel computing device 14 such as a GPU. As will be appreciated from the processes mentioned above, the distance calculation of the vectors arranged properly in the in-device memory 45 and the query feature vectors has high compatibility with hardware such as a GPU, and is performed very fast.

The representative cluster selecting unit 84 is implemented mainly by the parallel computing device 14. The representative cluster selecting unit 84 selects one of groups of the representative feature vectors based on the distance between the query feature vector and respective upper representative vectors calculated in the upper representative vector distance calculating unit 83. Specifically, for example, the representative cluster selecting unit 84 selects a group of representative feature vectors that are children of the upper representative vector having the shortest distance from the query feature vector. The groups of the representative feature vectors correspond to the respective clusters (representative clusters) in the first stage. Selecting a group of representative feature vectors corresponds to selecting a representative cluster corresponding to the group. Each of the upper representative vectors may represent plural representative feature vectors. Specifically, the representative cluster selecting unit 84 selects a group of the representative vectors by calculating a beginning address of a region in a memory for storing the group of the representative vectors. For example, suppose that the number of representative feature vectors to be children of an upper representative vector is fixed regardless of the upper representative vector and if it is clear what number the upper representative vector having the shortest distance is, the representative cluster selecting unit 84 can obtain the beginning address by a simple calculation such as multiplication. In this manner, a calculation requiring a branch or additional memory access is not necessary, and thus the processing to take advantage of the higher performance of hardware such as a GPU is possible.

The representative feature vector distance calculating unit 85 is implemented mainly by the parallel computing device 14. The representative feature vector distance calculating unit 85 calculates distances between each of at least some of the representative feature vectors and the query feature vector using the parallel processors 41. In this regard, a representative feature vector as calculation target is a representative feature vector belonging to the group selected by the representative cluster selecting unit 84. The representative feature vector distance calculating unit 85 calculates distances according to the flow chart of FIG. 13 similarly to the way in which the upper representative vector distance calculating unit 83 calculates the distances. However, the vector as calculate target is the representative feature vector mentioned above. Similar to the upper representative vector distance calculating unit 83, this process has high compatibility with hardware such as a GPU, and is performed very fast.

The image feature cluster selecting unit 86 is implemented mainly by the parallel computing device 14. The image feature cluster selecting unit 86 selects one of the image feature clusters based on the distance between the query feature vector and respective feature representative vectors calculated in the representative feature vector distance calculating unit 85. Specifically, for example, the image feature cluster selecting unit selects an image feature cluster represented by the representative feature vector having the shortest distance from the query feature vector.

The image feature vector transferring unit 87 is implemented mainly by the storage unit 12 and the parallel computing device 14. The image feature vector transferring unit 87 transfers the image feature vectors 20 belonging to the image feature cluster selected by the image feature cluster selecting unit 86 from the cluster vector storing unit 71 to the in-device memory 45, which is commonly accessible from the processors 41. The image feature vector transferring unit 87 transfers the data from the storage unit 12 to the in-device memory 45 using DMA functions of the parallel computing device 14 and the bus 15. Similar to the representative vector transferring unit 81 that transfers e.g., the representative feature vector in FIG. 11, the image feature vector transferring unit 87 arranges data of the image feature vector 20 so as to allow the processors 41 to read data stored in the in-device memory 45 in bulk.

The image feature vector distance calculating unit 88 is implemented mainly by the parallel computing device 14. The image feature vector distance calculating unit 88 calculates distances between each of the image feature vectors 20 and the query feature vector using the parallel processors 41. Here, the image feature vector 20 used for calculation is the image feature vector 20 belonging to the image feature cluster selected by the image feature cluster selecting unit 86. The data has been transferred by the image feature vector transferring unit 87 to the in-device memory 45. The image feature vector distance calculating unit 88 calculates a distance for each query feature vector according to the flow chart of FIG. 13 similarly to the way in which the upper representative vector distance calculating unit 83 calculates the distances. However, the vector as calculation target is the image feature vector 20. Similar to the upper representative vector distance calculating unit 83, this process has high compatibility with hardware such as a GPU, and is performed very fast.

The search result image selecting unit 89 is implemented mainly by the parallel computing device 14. The search result image selecting unit 89 selects one or more of the search target images as search results based on the calculation result of the image feature vector distance calculating unit 88. Based on the distances between the query feature vector and each of the image feature vectors 20, which are calculated by the image feature vector distance calculating unit 88, the search result image selecting unit 89 obtains the image corresponding to the query feature vector used in the distance calculation. Specifically, for example, the search result image selecting unit 89 selects, for each query feature vector, the image feature vector 20 from which the image feature vector 20 having the shortest distance from such query feature vector is extracted, and obtains the image from which the image feature vector 20 is extracted. An image ID of the obtained image is stored in the in-device memory 45.

Figure 14:
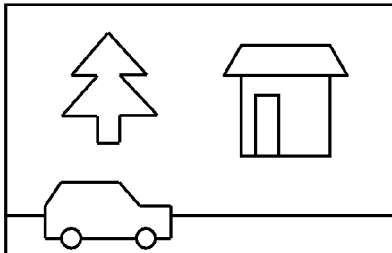
FIG. 14 A diagram illustrating an example of statistically processed results of images corresponding to query feature vector.
Figure 14:
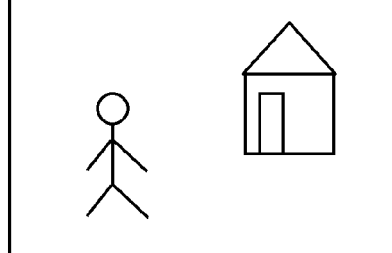
Figure 14:
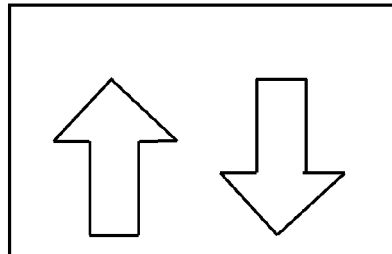
Figure 14:
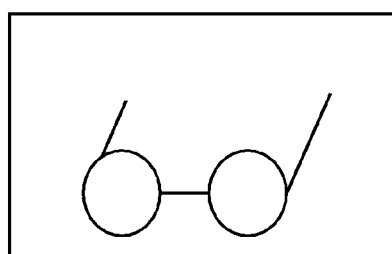

Subsequently, the search result image selecting unit 89 statistically processes the obtained images, each of which corresponds to one of the query feature vectors, and selects one or more images similar to the image serving as a query image. FIG. 14 illustrates an example of statistically processed results of the images corresponding to the query feature vectors. In the example of FIG. 14, the search result image selecting unit 89 counts, for each selected image, the number of query feature vectors corresponding to the image (number of times the image feature vector has been searched), and scores the counts for each image. The search result image selecting unit 89 statistically processes the images such that the images are sorted in descending order of the counts. The images are selected for each of query feature vectors images extracted from the query image. By statistically processing the images, it is possible to evaluate which image is similar to the query image among the images selected by the distance calculation. The search result image selecting unit 89 selects, from the statistically processed result, one or more images as images of the search result, and outputs information on the selected images to the web server 2. The selected images may be, for example, the image that has been searched the highest number of times, or some of the images that have been searched a larger number of times. The web server 2 outputs information for allowing the client device 3 to display the image of the search result.

It should be appreciated from the foregoing description that the processes performed in the upper representative vector distance calculating unit 83 through the image feature vector distance calculating unit 88 have high compatibility with hardware for parallel computing, such as a GPU, and are capable of fully utilizing the parallel computing capability. Parallel processing of the processes by the search result image selecting unit 89 is also possible to some extent, and enables the higher processing than the processing using the CPU 11. The processing load of the search result image selecting unit 89 is smaller than the processing load of the upper representative vector distance calculating unit 83 through the image feature vector distance calculating unit 88, and thus the percentage of the processing time of the search result image selecting unit 89 is substantially small in the overall processing time. In this manner, the advantage of reducing the processing time by using the GPU is fully available.

In the above, the processes of the image feature vector distance calculating unit 88 and the search result image selecting unit 89 are executed mainly by the parallel computing device 14, but may be executed mainly by the CPU 11, since the fast processing is available only by causing the GPU to execute other processes. If the processes of the image feature vector distance calculating unit 88 and the search result image selecting unit 89 are executed by the CPU 11, the process of the image feature vector transferring unit 87 can be omitted. As such, increase in computing time due to the processing by the CPU 11 can be suppressed compared to the distance calculation of the representative feature vector.

In this embodiment, the representative vectors have a two-stage tree structure, such as the upper representative vectors and the representative feature vectors, but may have a one-stage structure without the upper representative vectors. In this case, the processes of the upper representative vector distance calculating unit 83 and the representative cluster selecting unit 84 are not necessary, and the representative feature vector distance calculating unit 85 performs distance calculation for all representative feature vectors. Alternatively, parent representative vectors, which serve as parents of the upper representative vectors, may be provided to construct a three-stage or more tree structure. In the case of a three-stage or more tree structure, prior to the processes of the upper representative vector distance calculating unit 83, the process of calculating distances about the parent representative vectors and the process of selecting the group of the upper representative vectors are executed. The upper representative vector distance calculating unit 83 then performs distance calculation for the selected group of upper representative vectors (some of upper representative vectors).

Figure 15:
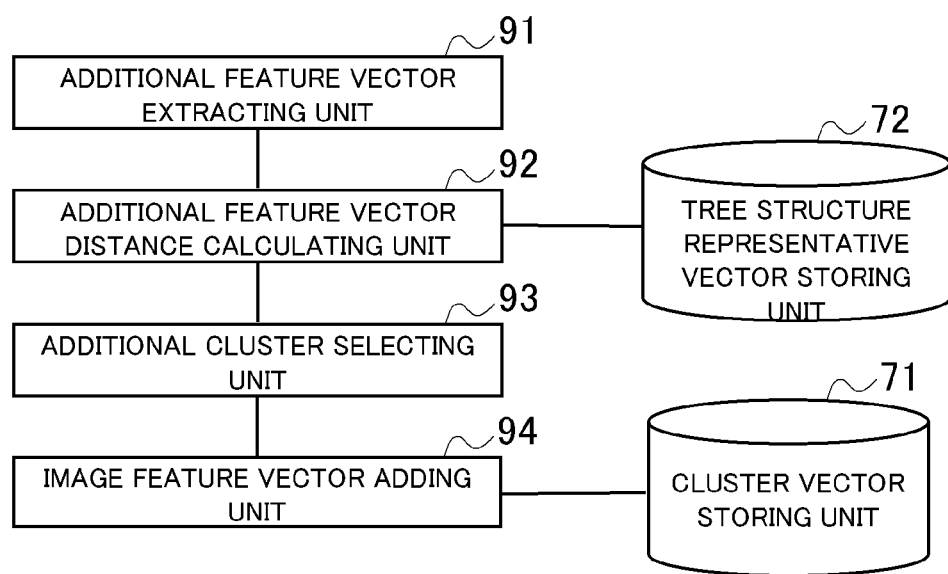
FIG. 15 A functional block diagram illustrating a functional configuration of an index adding unit.

FIG. 15 is a functional block diagram showing the functional configuration of the index adding unit 53. The index adding unit 53 functionally includes an additional feature vector extracting unit 91, an additional feature vector distance calculating unit 92, an additional cluster selecting unit 93, and an image feature vector adding unit 94.

The additional feature vector extracting unit 91 is implemented mainly by the CPU 11 and the storage unit 12. The additional feature vector extracting unit 91 extracts plural image feature vectors 20 among from the images stored in the storage unit 12 and to be added as search targets. This extracting method may be the same as the method of the image feature vector extracting unit 61. In the following, this image feature vector 20 is referred to as an additional feature vector.

The additional feature vector distance calculating unit 92 is implemented mainly by the parallel computing device 14. The additional feature vector distance calculating unit 92 respectively calculates distances between the additional feature vectors and the representative feature vectors stored in the tree structure representative vector storing unit 72. The distances are calculated based on a flow in which the query feature vector and the calculate target vector in the processing shown in FIG. 13 are respectively replaced with the additional feature vector and the representative feature vector included in all representative clusters.

The additional cluster selecting unit 93 is calculated mainly by the parallel computing device 14. The additional cluster selecting unit 93 selects an image feature cluster to which the additional feature vectors belongs based on the calculation result of the additional feature vector distance calculating unit 92. For example, for each of the additional feature vectors, the additional cluster selecting unit 93 selects the image feature cluster represented by the representative feature vector having the shortest distance from the additional feature vector as an image feature cluster corresponding to the additional feature vector.

The image feature vector adding unit 94 is implemented mainly by the CPU 11 and the storage unit 12. The image feature vector adding unit 94 adds the image feature cluster selected by the additional cluster selecting unit 93 to the corresponding additional feature vector, and stores data of the image feature cluster in the cluster vector storing unit 71. In this manner, when adding search target images, the image can be added to search targets without further clustering, and thus processing time involved in adding the images can be saved.

The invention claimed is:

1. An image search device, comprising:
    a plurality of parallel processors each of which includes a register and which execute a same instruction;
    an instruction unit;
    a common memory which is commonly and directly accessible from the plurality of parallel processors,
    wherein each element of a vector stored in common memory are loaded, at one time, into the register of a corresponding one of the plurality of parallel processors in bulk according to one instruction from the instruction unit, and each of the plurality of parallel processors processes the loaded element of the vector;
    a storage means storing a plurality of image feature vectors that are respectively extracted from a plurality of images serving as search targets and respectively belong to one of a plurality of clusters, and a plurality of representative feature vectors each of which represents one of the plurality of clusters, in which more than one of the image feature vectors are extracted from one of the plurality of images;

representative vector transfer means for transferring the plurality of the representative feature vectors from the storage means to the common memory;

query feature vector obtaining means for obtaining and storing, in the common memory, one or more query feature vectors that are extracted from an image serving as a query;

first distance calculating means for calculating a distance between at least a part of the plurality of transferred representative feature vectors and the query feature vector using the plurality of parallel processors;

cluster selecting means selecting a cluster from the plurality of clusters based on the calculation result of the first distance calculating means;

image feature vector transfer means for transferring the image feature vectors, which belongs to the selected cluster from the storage means to the common memory after the cluster unit selects the cluster;

second distance calculating means for calculating a distance between the plurality of image feature vectors, which belong to the cluster selected based on a calculation result of the first distance calculating means, and the query feature vector;

selecting means for selecting at least one of the plurality of images based on a calculation result of the second distance calculating means; and cluster generator for grouping the plurality of image feature vectors to the plurality of clusters so that a sum of (a number of the plurality of image feature vectors)×(a dimension of the image feature vector)×(a size of one element of the image feature vector)/(the number of the plurality of clusters) and (a number of the plurality of representative feature vectors)×(a dimension of the representative feature vector)×(a size of one element of the representative feature vector) is less than the size of the common memory, wherein the second distance calculating means calculates a distance between the transferred image feature vectors and the query feature vector using the plurality of parallel processors; and wherein (a number of the plurality of image feature vectors in the storage means)×(the dimension of the image feature vector)×(the size of one element of the image feature vector) is more than the size of the common memory.

2. The image search device according to claim 1, wherein a data amount of the plurality of representative feature vectors is less than a size of the common memory.

3. The image search device according to claim 2, wherein a data amount of the plurality of image feature vectors that belong to one of the plurality of clusters is less than the size of the common memory, and wherein a data amount of the plurality of image feature vectors that belong to the plurality of clusters is more than the size of the common memory.

4. The image search device according to claim 1, wherein a data amount of the plurality of image feature vectors that belong to one of the plurality of clusters and the plurality of representative vectors is less than the size of the common memory, wherein the image feature vector transfer means replaces a plurality of image feature vectors that have previously been stored in the common memory with the plurality of image feature vectors that belong to the selected cluster.

5. The image search device according to claim 1, further comprising:

image feature vector additional extracting means for extracting a plurality of image feature vectors from an image to be added as a search target; and image feature vector adding means for adding the plurality of image feature vectors, which are extracted by the image feature vector additional extracting means, to one of the clusters.

6. An image search method for causing a computer, which includes an instruction unit, a plurality of parallel processors each of which includes a register and which executes a same instruction, and a common memory which is commonly and directly accessible from the plurality of parallel processors, wherein each element of a vector stored in the common memory are loaded, at one time, into the register of corresponding one of the plurality of parallel processors in bulk according to one instruction from the instruction unit and each of the plurality of parallel processors processes the loaded element of the vector, to search an image, the method comprising:

a representative vector transfer step for transferring a plurality of representative feature vectors from storage means to the common memory, the storage means storing a plurality of image feature vectors that are respectively extracted from a plurality of images serving as search targets and respectively belong to one of a plurality of clusters, and the plurality of representative feature vectors each of which represents one of the plurality of clusters, in which more than one of the image feature vectors are extracted from one of the images;

a query setting step for setting, in the common memory, one or more query feature vectors extracted from an image serving as a query;

a first distance calculating step for calculating a distance between at least a part of the plurality of transferred representative feature vectors and the query feature vector using the plurality of parallel processors;

a cluster selecting step for selecting a cluster from the plurality of clusters based on the calculation result of the first distance calculating means;

an image feature vector transfer step for transferring the image feature vectors, which belongs to the selected cluster from the storage means to the common memory after the cluster selecting unit selects the cluster;

a second distance calculating step for calculating a distance between the plurality of image feature vectors that belong to the cluster selected based on a calculation result of the first distance calculating step and the query feature vector; and a selecting step for selecting at least one of the plurality of images based on a calculation result of the second distance calculating step, a cluster generation step for grouping the plurality of image feature vectors to the plurality of clusters so that a sum of (a number of the plurality of image feature vectors)×(a dimension of the image feature vector)×(a size of one element of the image feature vector)/the number of the plurality of clusters) and (a number of the plurality of representative feature vectors)×(a dimension of the representative feature vector)×(a size of one element of the representative feature vector) is less than the size of the common memory, wherein the second distance calculating step calculates a distance between the transferred image feature vectors and the query feature vector using the plurality of parallel processors; and wherein (a number of the plurality of image feature vectors in the storage means)×(the dimension of the image feature vector)×(the size of one element of the image feature vector) is more than the size of the common memory.

7. A non-transitory computer-readable storage medium that stores a program for causing a computer, which includes an instruction unit, a plurality of parallel processors each of which includes a register and which executes a same instruction, and a common memory which is commonly and directly accessible from the plurality of parallel processors wherein each element of a vector stored in the common memory are loaded, at one time, into the register of corresponding one of the plurality of parallel processors in bulk according to one instruction from the instruction unit and each of the plurality of parallel processors processes the loaded element of the vector, to function as:

representative vector transfer means for transferring a plurality of representative feature vectors from storage means to the common memory, the storage means storing a plurality of image feature vectors that are respectively extracted from a plurality of images serving as search targets and respectively belong to one of a plurality of clusters, and the plurality of representative feature vectors each of which represents one of the plurality of clusters, in which more than one of the image feature vectors are extracted from one of the images;

query setting means for setting, in the common memory, one or more query feature vectors extracted from an image serving as a query;

first distance calculating means for calculating a distance between at least a part of the plurality of transferred representative feature vectors and the query feature vector using the plurality of parallel processors;

a cluster selecting means for selecting a cluster from the plurality of clusters based on the calculation result of the first distance calculating means;

an image feature vector transfer means for transferring the image feature vectors, which belongs to the selected cluster from the storage means to the common memory after the cluster selecting unit selects the cluster;

second distance calculating means for calculating a distance between the plurality of image feature vectors that belong to the cluster selected based on a calculation result of the first distance calculating means and the query feature vector; and selecting means for selecting at least one of the plurality of images based on a calculation result of the second distance calculating means, cluster generation means for grouping the plurality of image feature vectors to the plurality of clusters so that a sum of (a number of the plurality of image feature vectors)×(a dimension of the image feature vector)×(a size of one element of the image feature vector)/(the number of the plurality of clusters) and (a number of the plurality of representative feature vectors)×(a dimension of the representative feature vector)×(a size of one element of the representative feature vector) is less than the size of the common memory, wherein the second distance calculating means calculates a distance between the transferred image feature vectors and the query feature vector using the plurality of parallel processors; and wherein (a number of the plurality of image feature vectors in the storage means)×(the dimension of the image feature vector)×(the size of one element of the image feature vector) is more than the size of the common memory.

8. The image search device according to claim 1, wherein a data amount of the plurality of representative feature vectors is less than a size of the common memory.

9. The image search device according to claim 8, wherein a data amount of the image feature vectors that belong to one of the clusters is less than the size of the common memory, and wherein a data amount of the image feature vectors that belong to the clusters is more than the size of the common memory.

10. The image search device according to claim 1, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

11. The image search device according to claim 2, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

12. The image search device according to claim 3, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

13. The image search device according to claim 4, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

14. The image search device according to claim 8, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

15. The image search device according to claim 9, further comprising:

image feature vector additional extracting means for extracting a plurality of image feature vectors from an image to be added as a search target; and image feature vector adding means for adding the plurality of the image feature vectors, which are extracted by the image feature vector additional extracting means, to one of the clusters.

16. The image search device according to claim 1,
wherein the first distance calculating means loads, at one time, each element of one of the plurality of transferred representative feature vectors from the common memory into the register of each of the plurality of parallel processors in which the loaded element is calculated, subtracts, at one time, the element stored in the register from the corresponding elements of one of the one or more query feature vectors and squares the subtraction result, and wherein the second distance calculating means loads, at one time, each element of one of the plurality of image feature vectors which belong to the selected cluster from the common memory into the register of corresponding one of the plurality of parallel processors in which the loaded element is calculated, subtracts, at one time, the element stored in the register from the corresponding elements of one of the one or more query feature vectors and that squares the subtraction result.

17. The image search device according to claim 1,
wherein the representative vector transferring means read the plurality of the representative feature vectors in which the size of each element is 1 byte, and convert the plurality of the representative feature vectors so that the size of each converted element is 4 bytes, and transfer the plurality of the converted representative feature vectors to the common memory.

18. The image search device according to claim 1,
wherein the image feature vector transfer means transfers the image feature vectors which belongs to the selected cluster to a predetermined region for one cluster in the common memory if any cluster is selected.

19. The image search device according to claim 1,
wherein the image feature vector transfer means transfers the image feature vectors which belong to the selected cluster into a predetermined region for storing one image feature cluster in the common memory each time.

20. The image search device according to claim 1,
wherein the image feature vector transfer means transfers the image feature vectors, which belong to the selected cluster from a memory which is not directly accessible from the plurality of parallel processors to the common memory.

* * * * *